US010248859B2

(12) United States Patent
Lee et al.

(10) Patent No.: US 10,248,859 B2
(45) Date of Patent: Apr. 2, 2019

(54) VIEW FINDER APPARATUS AND METHOD OF OPERATING THE SAME

(71) Applicant: SAMSUNG ELECTRONICS CO., LTD., Suwon-si, Gyeonggi-do (KR)

(72) Inventors: Jin-won Lee, Seongnam-si (KR); Chong-sam Chung, Hwaseong-si (KR); Sung-hyun Cho, Suwon-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 212 days.

(21) Appl. No.: 14/995,468

(22) Filed: Jan. 14, 2016

(65) Prior Publication Data

US 2016/0379051 A1 Dec. 29, 2016

(30) Foreign Application Priority Data

Jun. 26, 2015 (KR) .................... 10-2015-0091390

(51) Int. Cl.
*H04N 5/00* (2011.01)
*G06K 9/00* (2006.01)
*H04N 5/232* (2006.01)
*H04N 5/33* (2006.01)

(52) U.S. Cl.
CPC ..... *G06K 9/00604* (2013.01); *H04N 5/23219* (2013.01); *H04N 5/23222* (2013.01); *H04N 5/23293* (2013.01); *H04N 5/33* (2013.01)

(58) Field of Classification Search
CPC .... A61B 3/10; A61B 3/00; A61B 3/14; A61B 3/113; A61B 3/107; A61B 3/117; A61B 3/145
See application file for complete search history.

(56) References Cited

U.S. PATENT DOCUMENTS

| 4,287,410 | A | * | 9/1981 | Crane | ................... | A61B 3/113 250/201.4 |
| 5,485,241 | A | | 1/1996 | Irie et al. | | |
| 5,797,046 | A | | 8/1998 | Nagano et al. | | |

(Continued)

FOREIGN PATENT DOCUMENTS

| EP | 1 131 663 | 9/2001 |
| WO | 00/26713 | 5/2000 |

OTHER PUBLICATIONS

Mackworth et al. Eye Fixations Recorded on Changing Visual Scenes by the Television Eye-Marker, Journal of the Optical Society of America, vol. 48, No. 7 Jul. 1958.*

(Continued)

*Primary Examiner* — Frank F Huang
(74) *Attorney, Agent, or Firm* — Nixon & Vanderhye, P.C.

(57) ABSTRACT

A viewfinder apparatus includes a window on which a reference mark is disposed; a photography unit (e.g., an eye imaging camera) configured to photograph eyes of a user via the window; and a controller configured to detect a location where the photography unit has been moved, based on a location of the reference mark included in a first image captured by the photography unit before the photography unit is moved and a location of a reference mark included in a second image captured by the photography unit after the photography unit is moved, wherein the controller tracks the eyes of the user by using the detected location.

18 Claims, 12 Drawing Sheets

(56) References Cited

U.S. PATENT DOCUMENTS

| | | | | |
|---|---|---|---|---|
| 5,859,921 A | * | 1/1999 | Suzuki | G06K 9/00268 |
| | | | | 382/118 |
| 2006/0152676 A1 | * | 7/2006 | Baumann | A61B 3/113 |
| | | | | 351/205 |
| 2011/0050981 A1 | | 3/2011 | Inoue | |
| 2012/0022408 A1 | * | 1/2012 | Hubschman | A61B 3/0025 |
| | | | | 600/587 |
| 2012/0230547 A1 | * | 9/2012 | Durnell | A61B 3/113 |
| | | | | 382/103 |
| 2013/0155309 A1 | | 6/2013 | Hill et al. | |
| 2014/0211069 A1 | | 7/2014 | Koguchi | |
| 2014/0211995 A1 | | 7/2014 | Model | |
| 2015/0077329 A1 | * | 3/2015 | Yoon | G06F 3/013 |
| | | | | 345/156 |
| 2015/0130955 A1 | | 5/2015 | Misawa | |
| 2015/0146028 A1 | | 5/2015 | Choi | |
| 2015/0160725 A1 | * | 6/2015 | Lee | G06F 3/013 |
| | | | | 348/78 |
| 2016/0029883 A1 | * | 2/2016 | Cox | A61B 3/00 |
| | | | | 148/48 |

OTHER PUBLICATIONS

Search Report and Written Opinion dated Apr. 20, 2016 in counterpart International Patent Application No. PCT/KR2016/000272.
Extended Search Report dated Mar. 16, 2018 in counterpart European Patent Application No. 16814546.4.

* cited by examiner

VIEW FINDER APPARATUS AND METHOD OF OPERATING THE SAME

CROSS-REFERENCE TO RELATED APPLICATION

This application is based on and claims priority under 35 U.S.C. § 119 to Korean Patent Application No. 10-2015-0091390, filed on Jun. 26, 2015, in the Korean Intellectual Property Office, the disclosure of which is incorporated by reference herein in its entirety.

BACKGROUND

1. Field

The disclosure relates to viewfinder apparatuses and methods of operating the same, and for example, to a viewfinder apparatus capable of detecting a location where a photography unit that tracks eyes of a user has moved, and a method of operating the viewfinder apparatus.

2. Description of Related Art

Viewfinders use optical systems included therein to provide viewfinder images to users. A viewfinder includes a visibility adjustment apparatus. The visibility adjustment apparatus is an apparatus for moving an optical system included in the viewfinder in order to adjust the focus of a viewfinder image according to the eyesight of a user.

The viewfinder further includes a camera that tracks the eyes of a user, and may set a region of interest (ROI) by analyzing the tracked eyes of the user.

SUMMARY

A viewfinder apparatus capable of detecting a location where a photography unit that tracks eyes of a user has moved, via an image captured by the photography unit, and a method of operating the viewfinder apparatus are provided.

Additional aspects will be set forth in part in the description which follows and, in part, will be apparent from the description.

According to an aspect of the disclosure, a viewfinder apparatus includes a window on which a reference mark is displayed; an eye imaging camera disposed and configured to photograph eyes of a user via the window; and a controller configured to detect a location where the eye imaging camera has been moved, based on a location of the reference mark included in a first image captured by the eye imaging camera before the eye imaging camera is moved and a location of the reference mark included in a second image captured by the eye imaging camera after the eye imaging camera is moved. The controller is configured to track the eyes of the user by using the detected location where the eye imaging camera has been moved.

The viewfinder apparatus may further include a display on which at least one object is displayed, and the viewfinder apparatus may set, as a region of interest (ROI), an area of the display that intersects with the tracked eyes of the user.

The display may display a viewfinder image from which a composition and photographing conditions of a subject that is to be photographed using the viewfinder apparatus are checked.

The viewfinder apparatus may further include an optical system configured to provide the user with an image that is displayed on the display via reflection or refraction of light incident via the window and to move along an optical axis.

The eye imaging camera may be moved in a same direction as a direction in which the optical system moves.

The window has displayed thereon a first reference mark and a second reference mark, and the controller may be configured to detect the location where the eye imaging camera has been moved, based on a first distance between the first reference mark and the second reference mark included in the first image and a second distance between the first reference mark and the second reference mark included in the second image.

The viewfinder apparatus may further include a storage unit configured to store a distance between the eye imaging camera that has not yet been moved and the window.

As a distance between the window and the eye imaging camera that has been moved increases, the second distance may decrease, and, as the distance between the window and the eye imaging camera that has been moved decreases, the second distance may increase.

The distance between the window and the eye imaging camera that has been moved may be inversely proportional to the second distance.

The controller may be configured to determine a misalignment tolerance generated due to a movement of the eye imaging camera, based on the location of the reference mark included in the first image and the location of the reference mark included in the second image, and to track the eyes of the user using the determined misalignment tolerance.

The eye imaging camera may include an infrared (IR) camera, and the reference mark may be formed of a material that reflects IR.

According to an aspect of the disclosure, a method of operating a viewfinder apparatus includes acquiring a first image by photographing eyes of a user via a window on which a reference mark is displayed; moving an eye imaging camera that photographs the eyes of the user; acquiring a second image by photographing the eyes of the user via the window by using the moved eye imaging camera; detecting a location where the eye imaging camera has been moved, based on a location of the reference mark included in the first image and a location of the reference mark included in the second image; and tracking the eyes of the user by using the location where the eye imaging camera has been moved.

The method may further include displaying at least one object on a display; and setting, as a region of interest (ROI), an area of the display that intersects with the tracked eyes of the user.

Displaying the at least one object on the display may include displaying a viewfinder image from which a composition and photographing conditions of a subject that is to be photographed using the viewfinder apparatus are checked.

Moving the eye imaging camera that photographs the eyes of the user may include moving the eye imaging camera in a same direction as a direction in which an optical system configured to provide the user with an image displayed on the display via reflection or refraction of light incident via the window and move along an optical axis moves.

The window may have displayed thereon a first reference mark and a second reference mark, and detecting the location where the eye imaging camera has been moved may include detecting the location where the eye imaging camera has been moved, based on a first distance between the first reference mark and the second reference mark included in the first image and a second distance between the first reference mark and the second reference mark included in the second image.

The method may further include storing a distance between the eye imaging camera that has not yet been moved and the window.

Detecting the location where the eye imaging camera has been moved may include determining a misalignment tolerance generated due to a movement of the eye imaging camera, based on the location of the reference mark included in the first image and the location of the reference mark included in the second image. The tracking of the eyes of the user may include tracking the eyes of the user by using the determined misalignment tolerance.

BRIEF DESCRIPTION OF THE DRAWINGS

These and/or other aspects will become apparent and more readily appreciated from the following detailed description, taken in conjunction with the accompanying drawings, in which like reference numerals refer to like elements, and wherein.

DETAILED DESCRIPTION

Figure 1A:
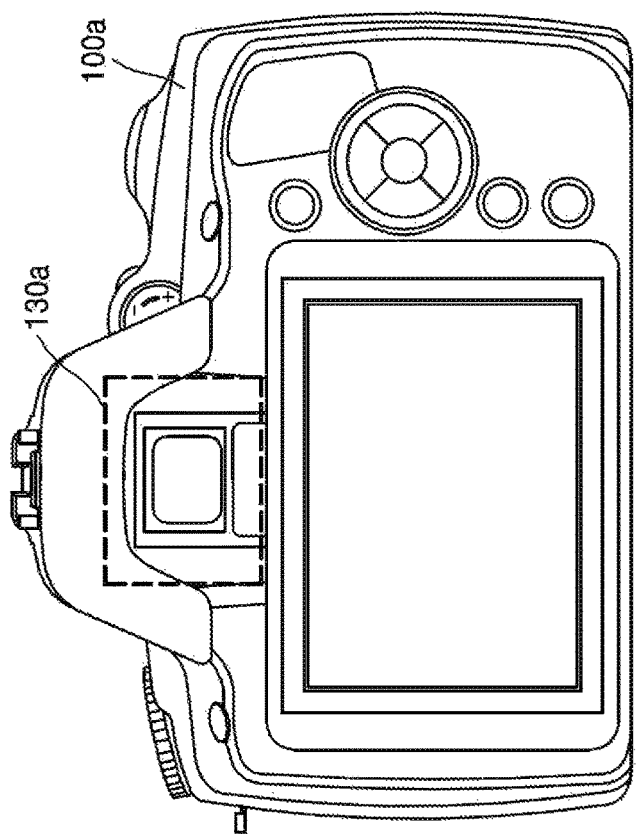
FIGS. 1A and 1B illustrate a viewfinder apparatus including a viewfinder.

Reference will now be made in detail to example embodiments, examples of which are illustrated in the accompanying drawings, wherein like reference numerals refer to the like elements throughout. In this regard, the example embodiments may have different forms and should not be construed as being limited to the descriptions set forth herein. Accordingly, the example embodiments are illustratively described below, by referring to the figures, to explain aspects of the disclosure. As used herein, the term "and/or" includes any and all combinations of one or more of the associated listed items. Expressions such as "at least one of," when preceding a list of elements, modify the entire list of elements and may not modify the individual elements of the list.

Hereinafter, the terms used in the specification will be briefly described, and then the examples will be described in greater detail.

Although general terms widely used at present were selected for describing the examples of the disclosure based on the functions thereof, these general terms may vary according to intentions of one of ordinary skill in the art, the advent of new technologies, and the like. Terms arbitrarily selected by the applicant of the disclosure may also be used in a specific case. In this case, their meanings need to be given in the disclosure. Hence, the terms may be defined based on their meanings and the content of the entire disclosure, not necessarily by simply stating the terms.

The terms "comprises" and/or "comprising" or "includes" and/or "including" when used in this disclosure, specify the presence of stated elements, but do not preclude the presence or addition of one or more other elements. The terms " . . . unit" and " . . . module" when used in this disclosure refers to a unit in which at least one function or operation is performed, and may be implemented as hardware, software, or a combination of hardware and software.

Example embodiments are described in detail herein with reference to the accompanying drawings so that this disclosure may be readily understood by one of ordinary skill in the art to which the disclosure pertains. The disclosure and examples may, however, be embodied in many different forms and should not be construed as being limited to the examples set forth herein. In the drawings, parts irrelevant to the description are omitted for simplicity of explanation, and like numbers refer to like elements throughout.

Figure 1B:
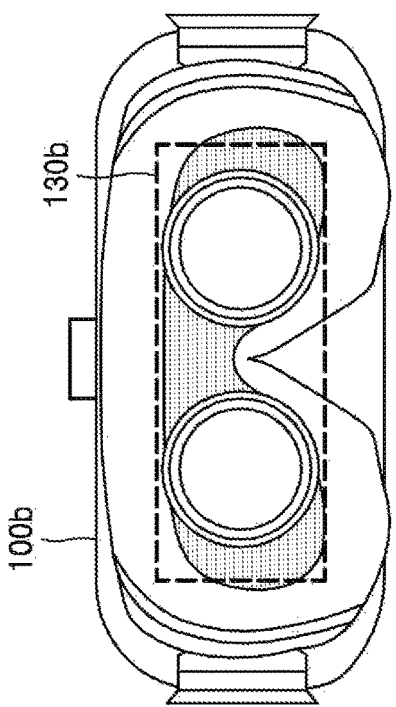

FIGS. 1A and 1B illustrate an example viewfinder apparatus 100 (see, e.g., FIG. 3) including a viewfinder. The viewfinder apparatus 100 according to an exemplary embodiment may include a viewfinder apparatus 100a of FIG. 1A and a viewfinder apparatus 100b of FIG. 1B.

Referring to FIG. 1A, an example viewfinder apparatus 100a may, for example, be a photography apparatus. For example, the photography apparatus may be implemented by various types of cameras, such as digital still cameras that capture still images or digital video cameras that capture moving pictures. The photography apparatus may also be implemented by a digital single-lens reflex camera (DSLR), a mirror-less camera, or a smart phone, but examples of the disclosure are not limited thereto. Examples of the photography apparatus may, for example, include an apparatus loaded with a camera module that includes a lens and an imaging device to photograph a subject to generate an image of the subject.

Referring to FIG. 1B, an example viewfinder apparatus 100b may be a head mounted display. For example, the head mounted display may be implemented by any of various apparatuses, such as a Virtual Reality (VR) apparatus that provides a VR image and an Augmented Reality (AR) apparatus that provides an AR image. However, examples of the disclosure are not limited thereto.

The example viewfinder apparatuses 100a and 100b may include viewfinders 130a and 130b, respectively. The viewfinders 130a and 130b may provide a viewfinder image so that a user may check the composition and photographing conditions of a subject, which is to be photographed, or provide a VR image.

The viewfinder apparatuses 100a and 100b may include visibility adjustment apparatuses, respectively. For example, a user may watch viewfinder images via optical systems included in the viewfinders 130a and 130b. In this case, since users have different eyesight, the focus of a viewfinder image may be adjusted based on the eyesight of the users by moving the optical systems in an optical axis direction. In this case, a user may move an optical system by using, for example, a visibility adjustment knob. However, examples of the disclosure are not limited thereto, and the viewfinder apparatuses 100a and 100b may automatically move their optical systems to conform to the eye sights of users.

The viewfinder apparatuses 100a and 100b may respectively include cameras for tracking eyes of a user. The cameras for tracking the eyes of the user may photograph the eyes of the user and track the eyes of the user by using a captured eye image. The viewfinder apparatuses 100a and 100b may detect, from a viewfinder image, a region on which the tracked eyes of the user linger (i.e., a region of interest (ROI)). When ROIs are detected, the viewfinder apparatuses 100a and 100b may display the detected ROIs and perform various operations on the detected ROIs. For example, the viewfinder apparatuses 100a and 100b may photograph a subject by focusing on the ROIs.

Figure 2A:
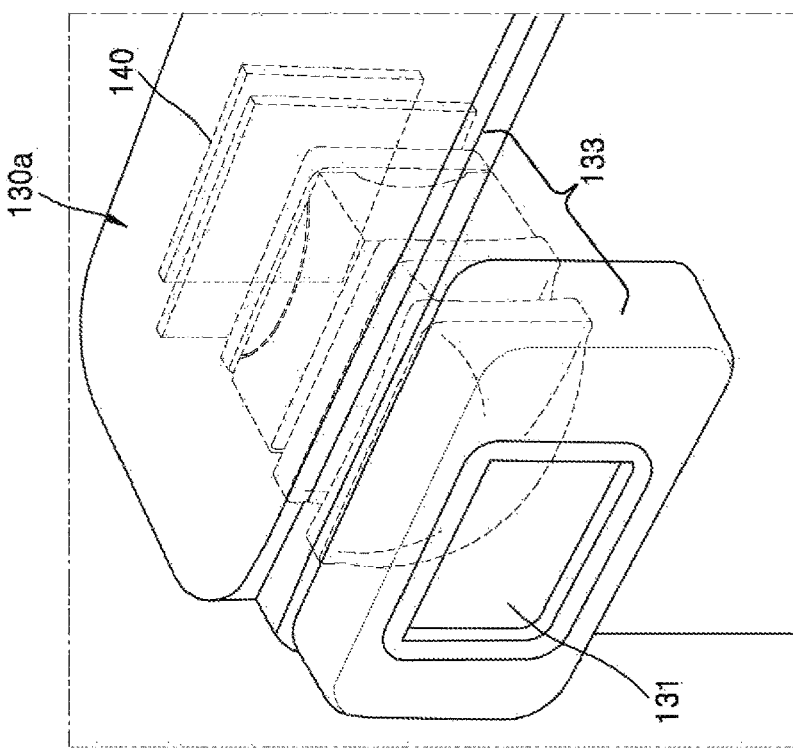
FIGS. 2A and 2B illustrate the viewfinder included in the viewfinder apparatus of FIG. 1A.
Figure 2B:
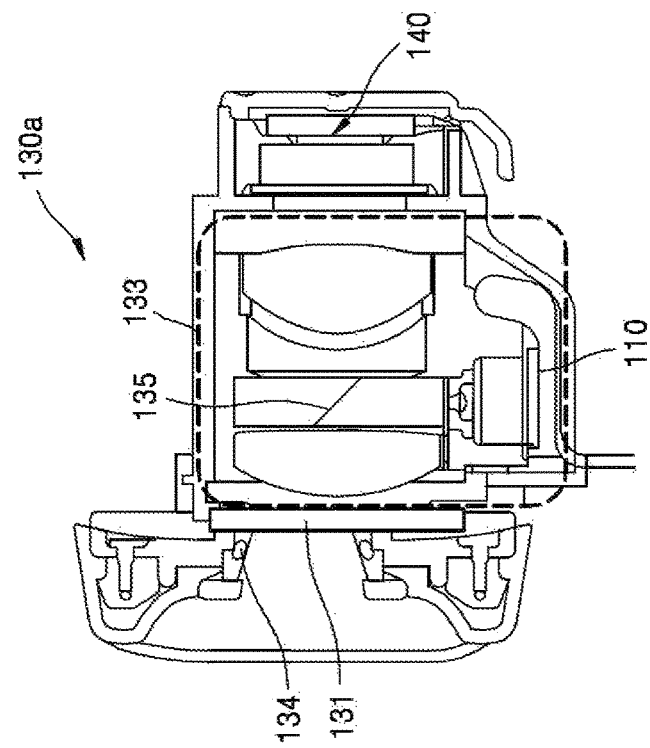

FIGS. 2A and 2B illustrate the example viewfinder 130a of FIG. 1A.

The viewfinder 130a may include a window 131, an optical system 133, and a display 140.

The window 131 may, for example, include a transparent material that transmits light therethrough, and may be implemented by a transparent display. When the window 131 is implemented by a transparent display, the window 131 may display information related to photography. The window 131 may also display a reference mark. The reference mark may, for example, be formed of a material that reflects infrared rays (IR), such that the reference mark may not be recognized by the eyes of the user but may be recognized by an IR camera or the like.

The display 140 may display a viewfinder image, and may, for example, be arranged in a path along which light incident on the window 131 travels. The user may bring the window 131 close to his or her eyes and view the viewfinder image displayed on the display 140 via the window 131.

The optical system 133 may, for example, be disposed between the window 131 and the display 140. The optical system 133 may include, for example, at least one lens and a prism. The optical system 133 may provide the user with the viewfinder image displayed on the display 140, via refraction, reflection, or the like, of light that is incident on the optical system 133. The at least one lens may include, for example, a zoom lens that magnifies a viewfinder image, and a visibility adjustment lens for adjusting the viewfinder image based on the eyesight of the user. A prism 135 may change the path of light such that a portion of light incident on the optical system 133 is incident on a photography unit 110.

The photography unit 110 may include at least one camera. The photography unit 110 may include an IR camera. The photography unit 110 may photograph the eyes of the user which are close to the window 131, via the window 131. As used herein, the term photography unit refers to an assembly comprising a camera, which may also be referred to as an eye imaging camera. While other elements may be included in the photography unit, the photography unit includes at least camera, e.g., an eye imaging camera. For ease and convenience of explanation, the term photography unit may be used throughout the disclosure. However, one skilled in the art will readily understand that the photography unit described, disclosed and discussed herein refers to an assembly that includes at least one camera, e.g., an eye imaging camera. The viewfinder apparatus 100 may include at least one illuminator 134 to provide light when the photography unit 110 photographs the eyes of the user. The illuminator 134 may be disposed near the window 131 and may include an IR light-emitting diode (LED).

The viewfinder apparatus 100 may detect a pupil and reflected light from the eye image of the photographed user, track the eyes of the user, and detect an area on the display 140 with which the tracked eyes of the user intersect.

A user of the viewfinder apparatus 100 may, for example, move the optical system 133 included in the viewfinder 130a in the optical axis direction using a visibility adjustment apparatus (for example, a visibility adjustment knob) in order to adjust a viewfinder image based, for example, on the eyesight of the user. When the optical system 133 is moved, the photography unit 110 may also be moved in the same direction as the direction in which the optical system 133 is moved.

A location of the photography unit 110 that photographs the eyes of a user is a parameter that is used in determination of tracking of the eyes of the user. Thus, when the photography unit 110 is moved, if a location where the photography unit 110 has been moved is not considered in the determination of tracking of the eyes of the user, the accuracy of eye tracking decreases. Accordingly, the viewfinder apparatus 100 may improve the accuracy of eye tracking by detecting a location where the photography unit 110 is moved and tracking the eyes of a user by using the detected location of the photography unit 110.

Although FIGS. 2A and 2B illustrate and describe the example viewfinder 130a of FIG. 1A, the description of the viewfinder 130a illustrated in FIGS. 2A and 2B may also apply to the viewfinder 130b of FIG. 1B.

Figure 3:
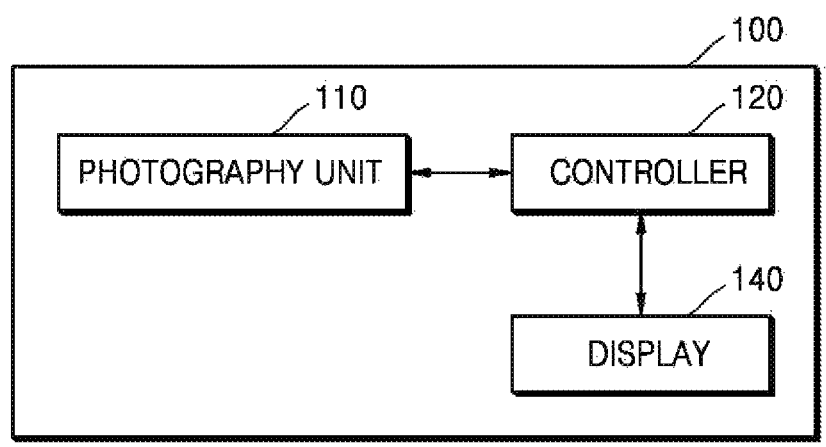
FIG. 3 is a block diagram illustrating an example structure of a viewfinder apparatus.

FIG. 3 is a block diagram illustrating an example structure of the viewfinder apparatus 100 according to an exemplary embodiment.

Referring to FIG. 3, the viewfinder apparatus 100 may include a photography unit 110 comprising an eye imaging camera, a controller 120, and a display 140.

As described above with reference to FIG. 2B, the photography unit 110 may include at least one camera, such as, for example, an eye imaging camera. The photography unit 110 may include an IR camera. When the optical system 133 is moved, the photography unit 110 may also be moved in the same direction as the direction in which the optical system 133 is moved. The photography unit 110 may photograph the eyes of the user via a window. For example, the photography unit 110 may acquire a first image by photographing the eyes of a user before the photography unit 110 is moved. The photography unit 110 may acquire a second image by photographing the eyes of the user after the photography unit 110 is moved. The first image and the second image may respectively include reference marks displayed (but not necessarily visible to a user as discussed above) on the window.

The controller 120 may be configured to detect a location where the photography unit 110 has been moved, based on a location of reference marks included in the first image and a location of reference marks included in the second image. For example, reference marks may include a first reference mark and a second reference mark, and the controller 120 may be configured to detect the location where the photography unit 110 has been moved, based on a first distance between a first reference mark and a second reference mark included in the first image and a second distance between a first reference mark and a second reference mark included in the second image. This will be described in greater detail below with reference to FIGS. 6 to 9.

The controller 120 may be configured to determine whether a misalignment tolerance is generated due to the movement of the photography unit 110. For example, when the photography unit 110 is moved along an optical axis (z axis), the photography unit 110 may actually move in x and y axial directions instead of moving only in an optical axial (z axial) direction. Thus, a misalignment tolerance may be generated in the x and y axial directions. The controller 120 may be configured to determine whether the misalignment tolerance has been generated in the x and y axial directions, and determine the generated tolerance, based on the location of the reference marks included in the first image and the location of the reference marks included in the second image. This will be described in greater detail below with reference to FIG. 10.

The display 140 may display at least one object.

The display 140 may, for example, display a viewfinder image such that a user may check the composition of a subject, which is to be photographed, and photographing conditions, or display a VR image.

The display 140 may, for example, be a liquid crystal display (LCD), an organic light-emitting display, or the like.

The display 140 may, for example, display a region that intersects the tracked eyes of a user (i.e., an ROI).

Figure 4:
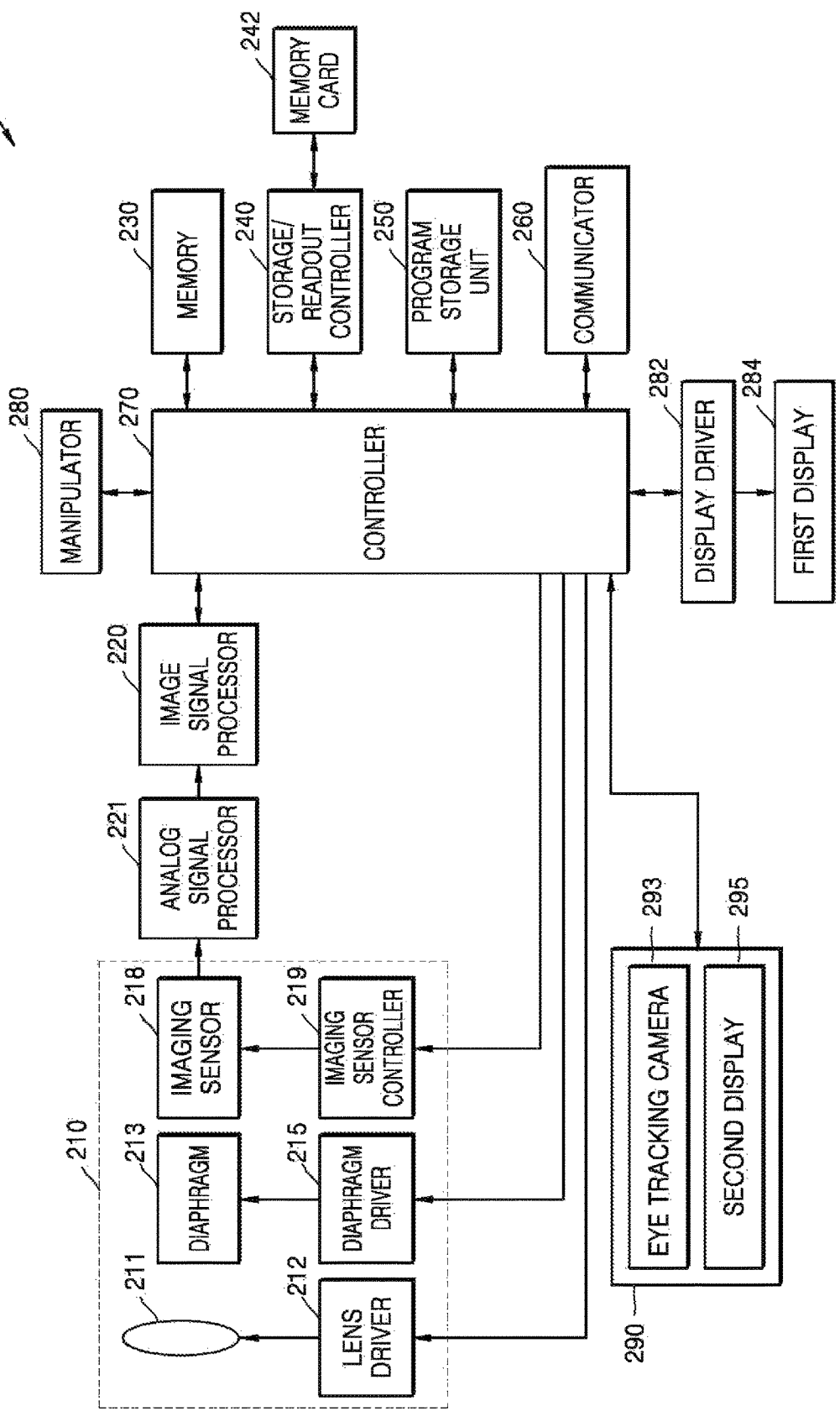
FIG. 4 is a block diagram illustrating an example structure of a viewfinder apparatus.

FIG. 4 is a block diagram illustrating an example structure of a viewfinder apparatus 100a. The viewfinder apparatus 100a may, for example, be implemented by a photographing apparatus. The photographing apparatus of FIG. 4 may be the viewfinder apparatus 100a of FIG. 1A.

Referring to FIG. 4, the viewfinder apparatus 100a may include a photography unit 210, an image signal processor 220, an analog signal processor 221, a memory 230, a storage/readout controller 240, a memory card 242, a program storage unit 250, a display driver 282, a first display 284, a controller 270, a manipulator 280, a communicator or communication circuitry 260, and a viewfinder module 290. The viewfinder module 290 may include an eye tracking camera 293 and a second display 295.

The eye tracking camera 293 of FIG. 4 may, for example, correspond to the photography unit 110 of FIG. 3, the second display 295 of FIG. 4 may, for example, correspond to the display 140 of FIG. 3, and the controller 270 of FIG. 4 may, for example, correspond to the controller 120 of FIG. 3, and thus repeated descriptions thereof will be omitted here.

Overall operations of the viewfinder apparatus 100a may be controlled by the controller 270. The controller 270 may be configured to provide control signals to a lens driver 212, a diaphragm driver 215, and an imaging sensor controller 219, for example, for respectively driving them.

The photography unit 210 generates an image corresponding to an electrical signal from incident light, and includes, for example, a lens 211, the lens driver 212, a diaphragm 213, the diaphragm driver 215, an imaging sensor 218, and the imaging sensor controller 219.

The lens 211 may, for example, include a plurality of groups of lenses or a plurality of lenses. A location of the lens 211 is controlled by the lens driver 212. The lens driver 212 is configured to adjust the location of the lens 211 based on a control signal provided by the controller 270.

The lens driver 211 is also configured to adjust a focal distance by adjusting the location of the lens 211, and is configured to perform operations, such as autofocusing, a zoom change, and a focus change.

An opening or closing degree of the diaphragm 213 is controlled by the diaphragm driver 215, and the diaphragm 213 is configured to adjust the amount of light that is incident on the imaging sensor 218.

An optical signal that has passed through the lens 211 and the diaphragm 213 forms an image of a subject when reaching a light-receiving surface of the imaging sensor 218. The imaging sensor 218 may, for example, be a charge coupled device (CCD) image sensor, a complementary metal oxide semiconductor image sensor (CIS), which converts an optical signal to an electrical signal, or the like. Sensitivity or the like of the imaging sensor 218 may, for example, be controlled by the imaging sensor controller 219. The imaging sensor controller 219 may be configured to control the imaging sensor 218 based on a control signal that may be automatically generated by a real-time input image signal or a control signal that is manually input via a manipulation by a user.

The analog signal processor 221 is configured to perform, for example, noise reduction, gain adjustment, waveform shaping, or analog-digital conversion (ADC), on an analog signal received from the imaging sensor 218.

The image signal processor 220 is configured to process a specific function on an image data signal obtained by the analog signal processor 221. For example, the image signal processor 220 may be configured to reduce noise included in input image data and to perform image signal processing for image quality improvement and specific effect provision, such as gamma correction, color filter array interpolation, color matrix, color correction, color enhancement, white balance adjustment, brightness smoothing, color shading, etc. The image signal processor 220 may, for example, be configured to generate an image file by compressing the input image data, or restore the image data from the image file. The compression format of an image may be a reversible or irreversible format. Examples of suitable compression formats for still images may, for example, include a Joint Photographic Experts Group (JPEG) format or a JPEG 2000 format. When a moving picture is recorded, the image signal processor 220 may be configured to generate a moving picture file by compressing a plurality of frames according to the Moving Picture Experts Group (MPEG) standard. The image file may be generated according to, for example, the exchangeable image file format (Exif) standard.

The image signal processor 220 may be configured to generate a moving picture file from an imaging signal generated by the imaging sensor 218. The imaging signal may be a signal that is generated by the imaging sensor 218 and processed by the analog signal processor 221. The image signal processor 220 may be configured to generate, from the imaging signal, frames which are to be included in the moving picture file. The frames may be coded according to a standard such as MPEG4, H.264/AVC, or windows media video (WMV) and compressed into a moving picture, and then the moving picture file may be generated using the moving picture. The moving picture file may be generated in any of various formats, such as mpg, mp4, 3gpp, avi, asf, and mov.

Image data output by the image signal processor 220 is input to the storage/readout controller 240 directly or via the memory 230. The storage/readout controller 240 is configured to store the image data in the memory card 242 automatically or according to a signal input by a user. The storage/readout controller 240 may be configured to read out data related to an image from the image file stored in the memory card 242, and to input the read-out data to the display driver 282 via the memory 230 or any other path such that the image is displayed on the first display 284. The memory card 242 may be detachable or may be permanently attached to the viewfinder apparatus 100a. For example, the memory card 242 may be a flash memory card such as a Secure Digital (SD) card.

The image signal processor 220 may also be configured to perform, for example, obscurity processing, color processing, blur processing, edge emphasis, image interpretation, image recognition, or image effect processing, on the received image data. Face recognition, scene recognition, or the like may be performed as the image recognition. The image signal processor 220 may be configured to process a signal of an image that is to be displayed on the first display 264. For example, the image signal processor 220 may be configured to perform brightness level control, color correction, contrast control, contour emphasis, screen division, generation of a character image or the like, or image synthesis.

A signal obtained by the image signal processor 220 may be input to the controller 270 via the memory 230, or directly to the controller 270 without using the memory 230. The memory 230 operates as a main memory of the viewfinder apparatus 100a, and temporarily stores information that is necessary when the image signal processor 220 or the controller 270 operates. The program storage unit 250 may store, for example, a program of an operating system for driving the viewfinder apparatus 100a and a program of an application system.

The viewfinder apparatus 100a includes the first display 284 to display an operational status of the viewfinder apparatus 100a or image information obtained by the viewfinder apparatus 100a. The first display 284 may provide visual information to a user. To provide visual information, the first display 284 may, for example, be implemented by an LCD, an organic light-emitting display, or the like. The first display 284 may, for example, be a touch screen capable of recognizing a touch input.

The display driver 282 provides a driving signal to the first display 284.

The controller 270 may be configured to process a received image signal and to control components of the viewfinder apparatus 100a based on the processed image signal or based on an external input signal. The controller 270 may correspond to a single processor or a plurality of processors. A processor may be implemented by an array of a plurality of logic gates, or by a combination of a general-use microprocessor and a memory in which a program executable by the general-use microprocessor is stored. It will also be understood by one of ordinary skill in the art to which this example pertains that the processor may be implemented by using other types of hardware.

The controller 270 may be configured to execute a program stored in the program storage unit 230, or to generate control signals for controlling autofocusing, a zoom change, a focus change, automatic exposure correction, and the like by using special modules included in the controller 270 and to provide the generated control signals to the diaphragm driver 215, the lens driver 212, and the imaging sensor controller 219, and to control operations of all of the components included in the viewfinder apparatus 100a, such as a shutter and a strobe.

The controller 270 may be connected to an external monitor and be configured to perform image signal processing on the image signal received from the image signal processor 220, and may be configured to transmit processed image data to the external monitor such that an image corresponding to the processed image data is displayed on the external monitor.

The manipulator 280 may be used by a user to input a control signal. The manipulator 280 may include various function buttons, such as a shutter-release button for inputting a shutter-release signal enabling the imaging sensor 218 to be exposed to light for a determined period of time to take a picture, a power button for inputting a control signal for controlling a power on or off operation, a zoom button for widening or narrowing a viewing angle according to an input, a mode selection button, and other photography setting value adjustment buttons. The manipulator 280 may be implemented by any other type of device via which a user is able to input a control signal, such as, a button, a keyboard, a touch pad, a touch screen, or a remote controller.

The communicator 260 comprises communication circuitry and may include, for example, a network interface card (NIC) or a modem, and may enable the viewfinder apparatus 100a to communicate with an external device via a network in a wired or wireless fashion.

Figure 5:
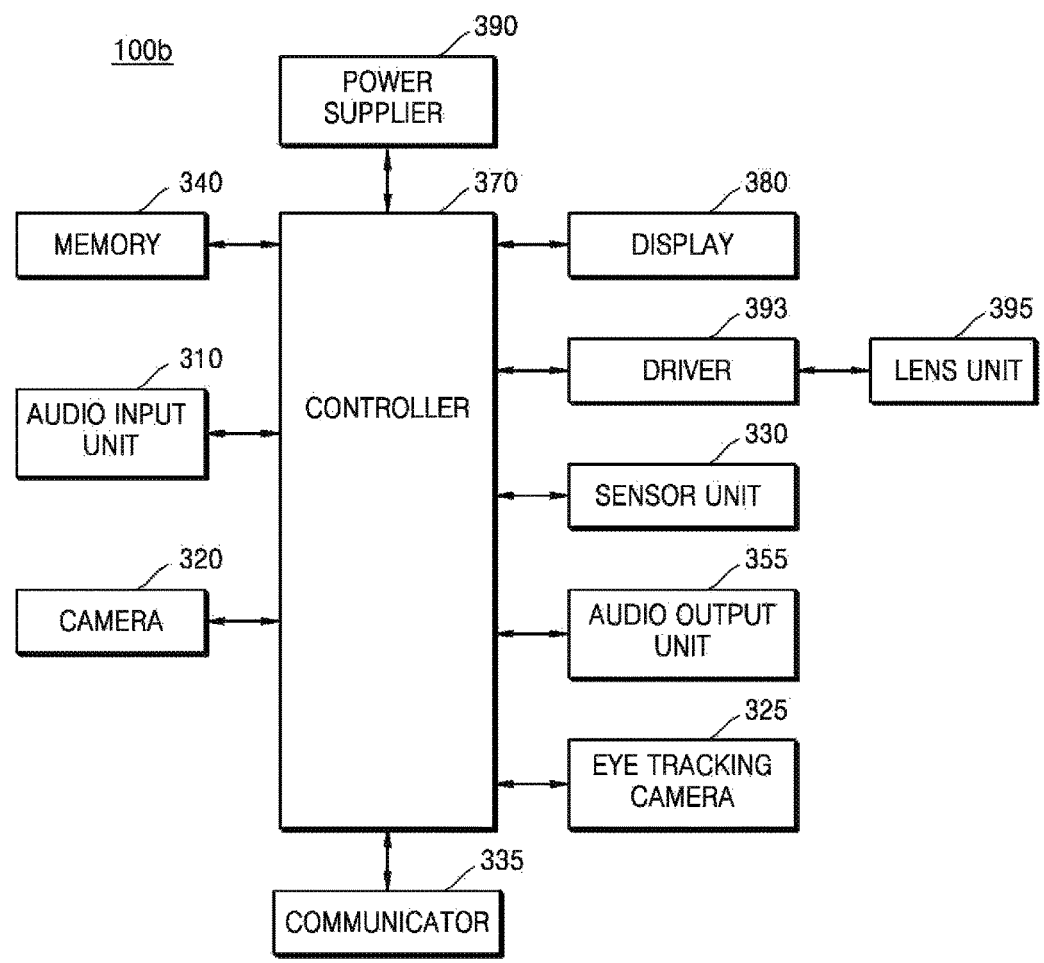
FIG. 5 is a block diagram illustrating an example structure of a viewfinder apparatus.

FIG. 5 is a block diagram illustrating an example structure of a viewfinder apparatus 100b according to an exemplary embodiment. The viewfinder apparatus 100b and may be implemented by a head mounted display that provides a VR image. The head mounted display of FIG. 5 may, for example, be the viewfinder apparatus 100b of FIG. 1B.

Referring to FIG. 5, the viewfinder apparatus 100b may include an audio input unit 310, a camera 320, an eye tracking camera 325, a sensor unit 330 including at least one sensor, a communicator 335 including communication circuitry, a memory 340, an audio output unit 355, a controller 370, a display 380, a power supplier 390, a driver 393, and a lens unit 395.

The eye tracking camera 325 of FIG. 5 may, for example, correspond to the photography unit 110 of FIG. 3, the display 380 of FIG. 5 may, for example, correspond to the display 140 of FIG. 3, and the controller 370 of FIG. 5 may, for example, correspond to the controller 120 of FIG. 3, and thus repeated descriptions thereof will be omitted here.

The audio input unit 310 may receive an external sound. The audio input unit 310 may transmit the received external sound to the controller 370.

The camera 320 may capture an image of an external environment. For example, the camera 320 may capture the image of the external environment when turned on. Then, the camera 320 may transmit the captured image to the controller 370.

The sensor unit 330 may sense motion information of the viewfinder apparatus 100b, for example, motion information of a user's head, and generate a sensing signal. For example, the sensor unit 330 may include at least one of a motion sensor (not shown), a proximity sensor (not shown), and a pressure sensor (not shown).

The motion sensor (not shown) senses a location, a movement, or the like of the head mounted display 100b by using an acceleration sensor, a gyro sensor, or the like. The acceleration sensor may include acceleration sensors with respect to an X axial direction, a Y axial direction, and a Z axial direction. The gyro sensor measures an angular velocity, and may sense a skew direction with respect to a reference direction. The proximity sensor (not shown) may detect, for example, existence or non-existence of an object that approaches the viewfinder apparatus 100b or an object that exists around the viewfinder apparatus 100b, without any mechanical contact. The pressure sensor (not shown) may detect application or non-application of a pressure to the viewfinder apparatus 100b, the size of the pressure, and the like. For example, the pressure sensor may sense a pressure that is applied by a hand of a user.

The communicator 335 includes communication circuitry and may provide an interface for communication with an external apparatus. The communicator 335 may include at least one of a mobile communication module (not shown), a wireless Internet module (not shown), a short-distance communication module (not shown), and a global positioning system (GPS) module (not shown). For example, the communicator 335 may perform WiFi communication via the wireless Internet module (not shown) and perform near field communication (NFC) via the short-distance communication module (not shown).

The communicator 335 may be configured to exchange data with a mobile terminal (not shown) or an external server (not shown). In detail, the communicator 335 may receive various pieces of data, such as image content, from the mobile terminal. The communicator 335 may transmit status information and the like of the viewfinder apparatus 100b to the mobile terminal. The communicator 335 may receive eyesight information of a user from the mobile terminal (not shown) or the external server (not shown).

The memory 340 may store a processing or control program for the controller 370 of the viewfinder apparatus 100b, or may perform a function for temporarily storing input or output data. The memory 340 may also store content data that is received from an external apparatus.

The audio output unit 355 may output an audio signal. For example, the audio output unit 355 may output an audio signal of content that is reproduced by the display 380. The audio output unit 355 may include a speaker or may include an audio output terminal for outputting audio to the outside.

The controller 370 is configured to control operations of the components of the viewfinder apparatus 100b. For example, the controller 370 may be configured to reproduce image content stored in the memory 340 or received via the communicator 335, based on a user input, and to output a video signal and an audio signal corresponding to the image content to the display 380 and the audio output unit 355, respectively.

As another example, the controller 370 may be configured to control an operation to be performed, corresponding to motion information of the viewfinder apparatus 100b, in particular, motion information about a user's head, which is obtained by the sensor unit 330.

The viewfinder apparatus 100b may adjust the focus of an image that is to be displayed on the display 380, based on the eyesight of a user. For example, the viewfinder apparatus 100b may change a distance between the eyes of a user and the lens unit 395. The driver 393 may change the distance between the eyes of the user and the lens unit 395 by moving the lens unit 395. The driver 393 may include a lens unit moving member (not shown) such as a stepping motor. The distance between the eyes of the user and the lens unit 395 may be changed by an operation of such a stepping motor.

The eye tracking camera 325 according to an example embodiment may photograph the eyes of a user and acquire an eye image of the user. The eye tracking camera 325 may also move when the lens unit 395 moves.

The display unit 380 may display a text or an image, for example.

For example, the display 380 may display an image. The display 380 may display a menu on an area corresponding to the eye direction of the user, in a menu display mode.

The power supplier 390 may supply power necessary for operating the components of the viewfinder apparatus 100b, under the control of the controller 370.

The block diagrams of the viewfinder apparatuses 100a and 100b shown in FIGS. 3-5 are merely illustrative examples. Components illustrated in FIGS. 3-5 may be combined or omitted according to the specifications of the viewfinder apparatuses 100a, and 100b when being actually implemented, or additional components may be included in the block diagrams of FIGS. 3-5. In other words, according to need, two or more components are combined into a single component, or a single component may be divided into two or more components. A function performed in each block is only an example to explain example embodiments, and a detailed operation or device of each block does not limit the scope of the disclosure.

Figure 6A:
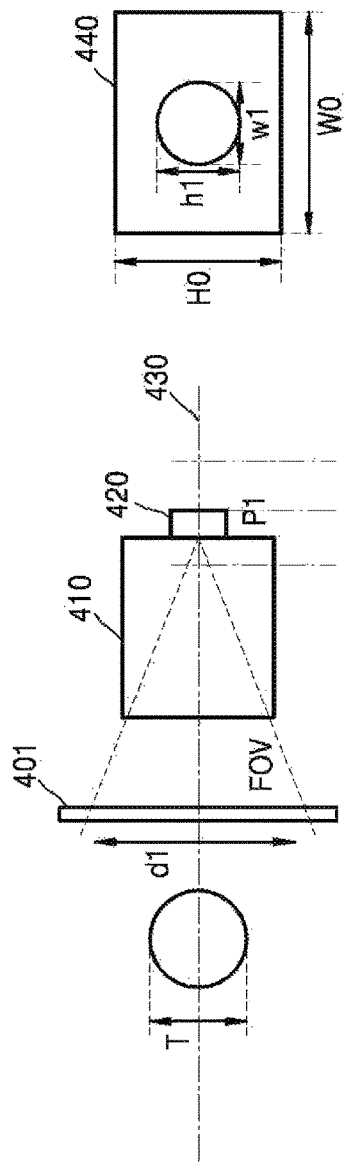
FIG. 6A to 6C illustrate an example in which the size of a subject that is photographed by the photography unit changes as the example eye imaging camera is moved.
Figure 6B:
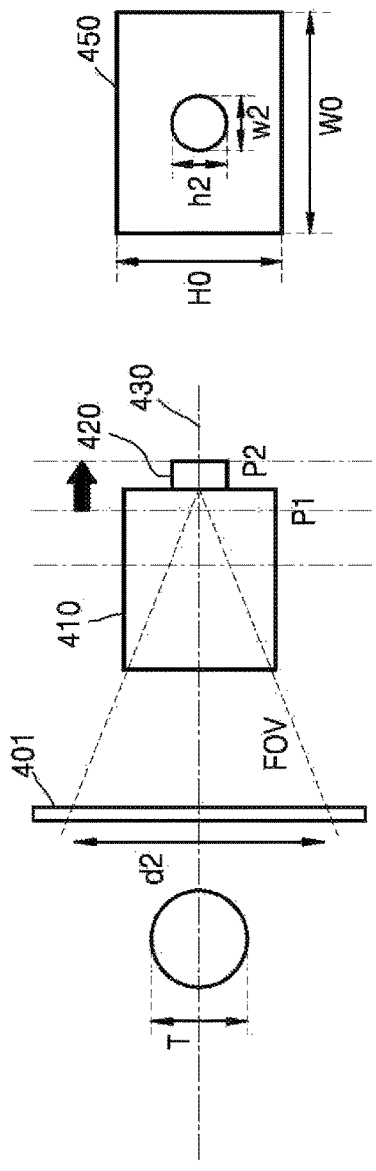
Figure 6C:
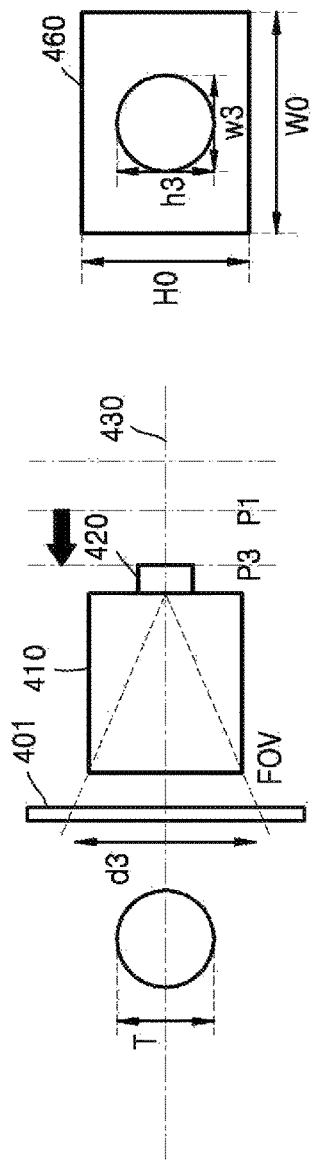

FIGS. 6A-6C illustrate an example in which, as an example photography unit, e.g., eye imaging camera, is moved, the size of a subject that is photographed by the photography unit changes.

Referring to FIGS. 6A-6C, an optical system 410 and a photography unit 420 (including, for example, an eye imaging camera) may be moved in the same direction along an optical axis 430. For example, when the optical system 410 is moved in a direction away from a window 401, the photography unit 420 may also be moved in a direction away from the window 401. On the other hand, when the optical system 410 is moved in a direction closer to the window 401, the photography unit 420 may also be moved in a direction closer to the window 401.

When the photography unit 420 is moved, a field of view (FOV) of the photography unit 420 may vary. The FOV represents a range in which a subject is photographed by the photography unit 420.

When the photography unit 420 moves in the direction away from the window 401, the FOV of the photography unit 420 increases, and the size of a subject included in a captured image decreases. On the other hand, when the photography unit 420 moves in the direction closer to the window 401, the FOV of the photography unit 420 decreases, and the size of a subject included in a captured image increases.

For example, as illustrated in FIG. 6A, when the photography unit 420 is positioned at a first point P1, a FOV (photographing range) may be d1 in each of a vertical direction and a horizontal direction based on the center of the photography unit 420, and the size of the subject may be T. Accordingly, when a horizontal size of a first image 440 captured by the photography unit 420 positioned at the first point P1 is W0 and a vertical size thereof is H0, a horizontal size w1 of a subject included in the first image 440 may, for example, be W0*T/d1, and a vertical size h1 thereof may, for example, be H0*T/d1.

As illustrated in FIG. 6B, when the photography unit 420 is moved from the first point P1 in a direction away from the window 401 and is positioned at a second point P2, the FOV of the photography unit 420 increases. Accordingly, the FOV (photographing range) of the photography unit 420 may be d2, which is greater than d1, in each of a vertical direction and a horizontal direction. In this case, when the photography unit 420 photographs the same subject, a horizontal size w2 of a subject included in a second image 450 may, for example, be W0*T/d2, and a vertical size h2 thereof may, for example, be H0*T/d2.

As illustrated in FIG. 6C, when the photography unit 420 is moved from the first point P1 in a direction closer to the window 401 and is positioned at a third point P3, the FOV of the photography unit 420 decreases. Accordingly, the FOV (photographing range) of the photography unit 420 may be d3, which is smaller than d1, in each of a vertical direction and a horizontal direction. In this case, when the photography unit 420 photographs the same subject, a horizontal size w3 of a subject included in a third image 460 may, for example, be W0*T/d3, and a vertical size h3 thereof may, for example, be H0*T/d3.

Accordingly, the example viewfinder apparatus 100 may detect the location where the photography unit 420 has moved, by using the principle that, as the photography unit 420 is moved, the size of a subject included in an image captured by the photography unit 420 changes.

FIGS. 7 and 8A to 8C are diagrams illustrating an example method by which the viewfinder apparatus 100 detects the location of a moved photography unit.

Figure 7:
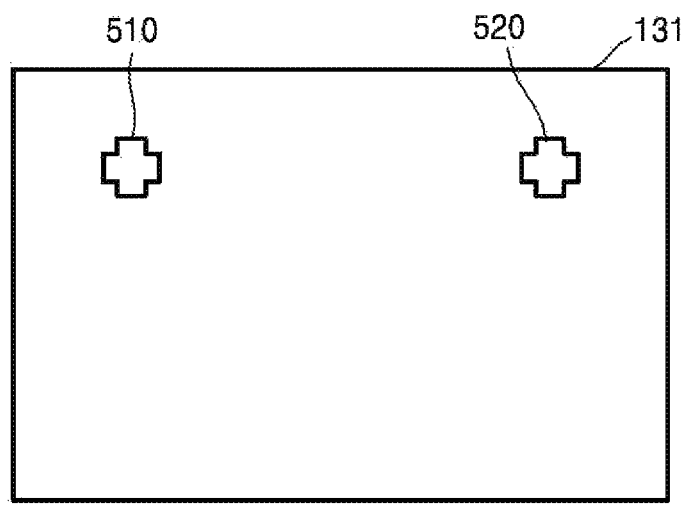
FIGS. 7 and 8A to 8C are diagrams illustrating an example method by which a viewfinder apparatus detects the location of a moved eye imaging camera.

Referring to FIG. 7, reference marks 510 and 520 may be displayed on a window 131. For example, the window 131 of FIG. 7 may represent a window as viewed from the photography unit 110. As illustrated in FIG. 7, the reference marks 510 and 520 may include a first reference mark 510 and a second reference mark 520 each having a cross shape. The first reference mark 510 may be displayed on a left upper corner of the window 131, and the second reference mark 520 may be displayed on a right upper corner thereof. However, examples are not limited thereto, and the number of reference marks 510 and 520 and the shape, size, and location of each of the reference marks 510 and 520 may vary. However, the reference marks 510 and 520 need to be positioned within an FOV (photographing range) when the photography unit 110 is positioned closest to the window 131 and an FOV (photographing range) when the photography unit 110 is positioned farthest from the window 131.

The reference marks 510 and 520 may, for example, be formed of an IR material. For example, when the reference marks 510 and 520 are formed of an IR material, a user is unable to recognize the reference marks 510 and 520 displayed on the window 131, and only the photography unit 110 including an IR camera is able to recognize and photograph the reference marks 510 and 520. Thus, when the user watches a viewfinder image via the window 131, the reference marks 510 and 520 displayed on the window 131 may not be recognized by the eyes of the user.

Figures 8A, 8B, 8C:
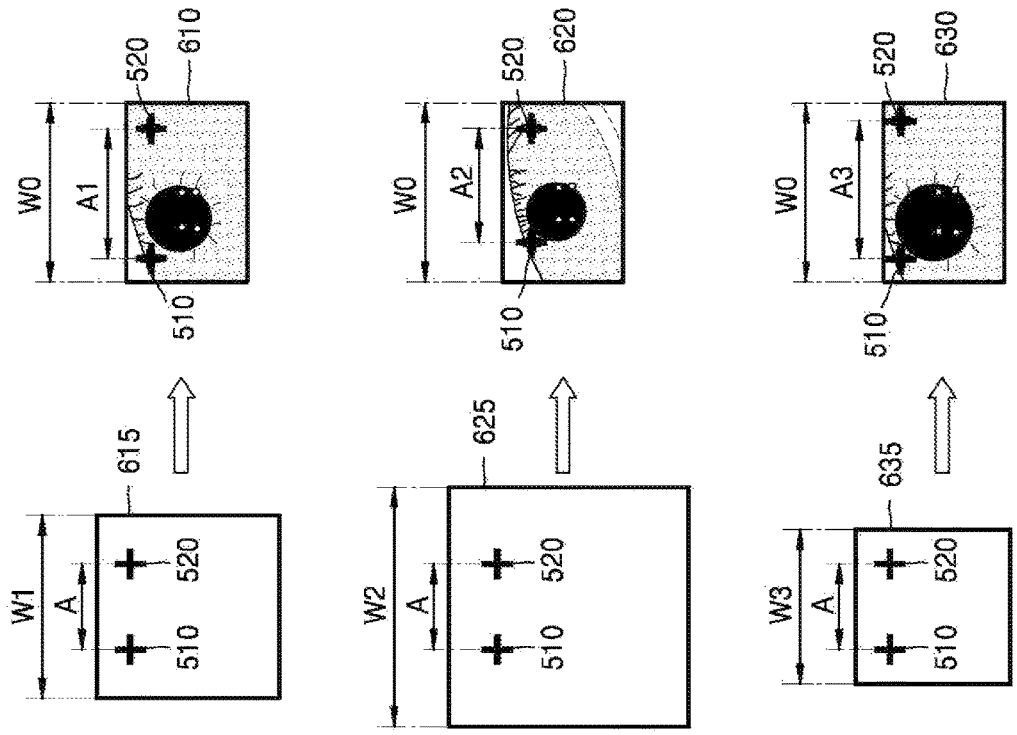

Referring to FIG. 8A, when the photography unit 110 (e.g., eye imaging camera) is positioned at a first point P1, the photography unit 110 may photograph an eye of a user via the window 131 and acquire a first image 610. In this case, a width of an entire screen 615 that is recognized at the first point P1 may be W1, and a distance between a first reference mark 510 and a second reference mark 520 may be A. However, the size of an output image may be determined based on pixels of an image sensor included in the photography unit 110, and, when a width of the first image 610 is W0, a distance A1 between reference marks 510 and 520 included in the first image 610 may, for example, be W0*A/W1.

Referring to FIG. 8B, when the photography unit 110 is positioned at a second point P2, the photography unit 110 may acquire a second image 620 by photographing the eye of the user via the window 131. When the photography unit 110 is positioned at the second point P2, the FOV (photographing range) of the photography unit 110 is greater than that when the photography unit 110 is positioned at the first point P1. Accordingly, a width of an entire screen 625 that is recognized at the second point P2 may be W2, which is greater than W1. A distance between a first reference mark 510 and a second reference mark 520 on the entire screen 625 may be A, similar to the case when the photography unit 110 was positioned at the first point P1. Since the photography unit 110 acquires the second image 620 by using the same image sensor as an image sensor that has acquired the first image 610, a width of the second image 620 is W0, which is the same as the width W0 of the first image 610. Accordingly, a distance A2 between reference marks within the second image 620 may, for example, be W0*A/W2.

When the photography unit 110 moves from the first point P1 to the second point P2, the FOV (photographing range) of the photography unit 110 increases. Accordingly, since a relative distance between reference marks within a captured image decreases, A2 may be less than A1.

Referring to FIG. 8C, when the photography unit 110 is positioned at a third point P3, the photography unit 110 may acquire a third image 630 by photographing the eye of the user via the window 131. When the photography unit 110 is positioned at the third point P3, the FOV (photographing range) of the photography unit 110 is less than that when the photography unit 110 is positioned at the first point P1. Accordingly, a width of an entire screen 635 that is recognized at the third point P3 may be W3, which is less than W1. A distance between a first reference mark 510 and a second reference mark 520 on the entire screen 635 may be A, similar to the case when the photography unit 110 was positioned at the first point P1. Since the photography unit 110 acquires the third image 630 by using the same image sensor as the image sensor that has acquired the first image 610, a width of the third image 630 is W0, which is the same as the width W0 of the first image 610. Accordingly, a distance A3 between reference marks within the third image 630 may, for example, be W0*A/W3.

When the photography unit 110 moves from the first point P1 to the third point P3, the FOV (photographing range) of the photography unit 110 decreases. Accordingly, since a relative distance between reference marks within a captured image decreases, A3 may be greater than A1.

Figure 9:
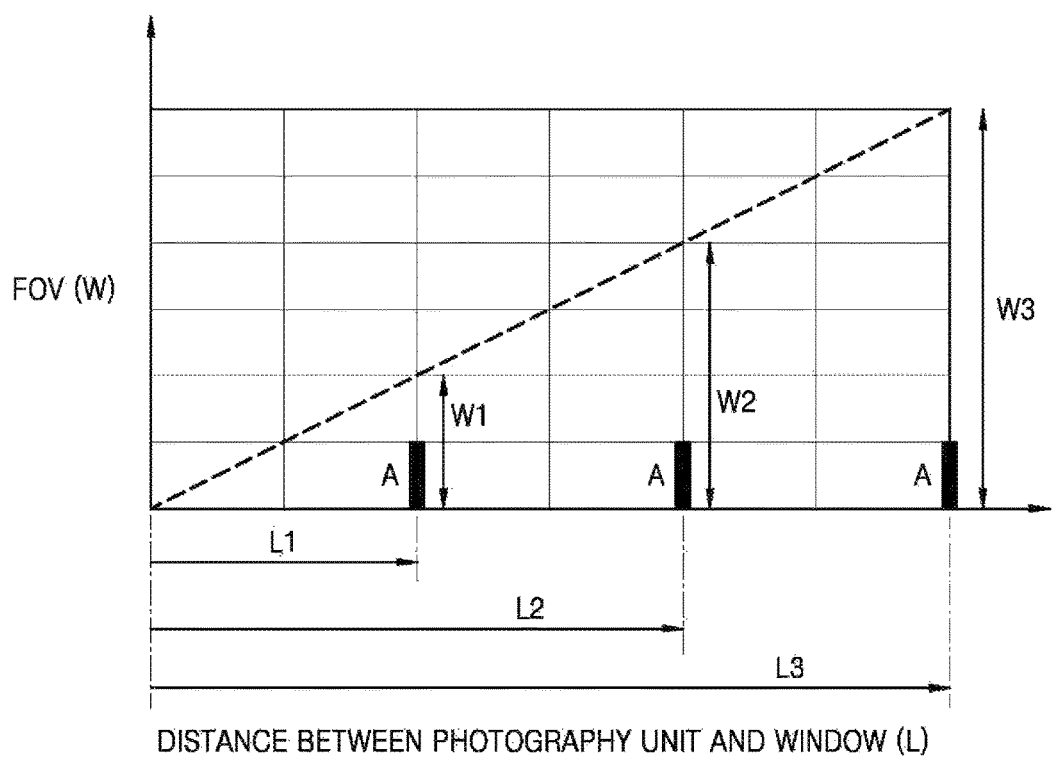
FIG. 9 is a graph illustrating a location of an example eye imaging camera, the size of a field of view (FOV) (photographing range) of the example eye imaging camera, and a distance between reference marks.

FIG. 9 is a graph illustrating an example location of a photography unit 110, the size of an FOV (photographing range) of the photography unit 110, and a distance between reference marks.

Referring to FIG. 9, a distance L between the photography unit 110 and a window is proportional to a size W of the photographing range. For example, as the distance L between the photography unit 110 and the window increases, the size W of the photographing range increases. Referring to FIG. 9, a relationship of W1/L1=W2/L2 is established. As described above with reference to FIG. 8, since A1=W0*A/W1 and A2=W0*A/W2, a relationship of L2=L1*A1/A2 may be established.

The viewfinder apparatus 100 may determine the distance L2 by using the values of L1, A1 and A2. In this case, the distance L1 between the window and the photography unit 110 at an initial location (the first point P1) may be previously stored in the viewfinder apparatus 100. The viewfinder apparatus 100 may measure a distance A1 between reference marks within the first image 610 and measure a distance A2 between reference marks within the second image 620.

Accordingly, the viewfinder apparatus 100 may determine a distance L2 between the photography unit 110 at the second point P2 and the window 131, based on the distances A1 and A2 between reference marks respectively within the first image 610 (image captured at a reference location) and the second image 620 and the distance L1 between the photography unit 110 at the first point P1 (reference point) and the window 131.

Similarly, the viewfinder apparatus 100 may determine a distance L3 between the photography unit 110 at the third point P3 and the window 131, based on the distances A1 and A3 between reference marks respectively within the first image 610 (image captured at a reference location) and the third image 630 and the distance L1 between the photography unit 110 at the first point P1 (reference point) and the window 131.

Figure 10:
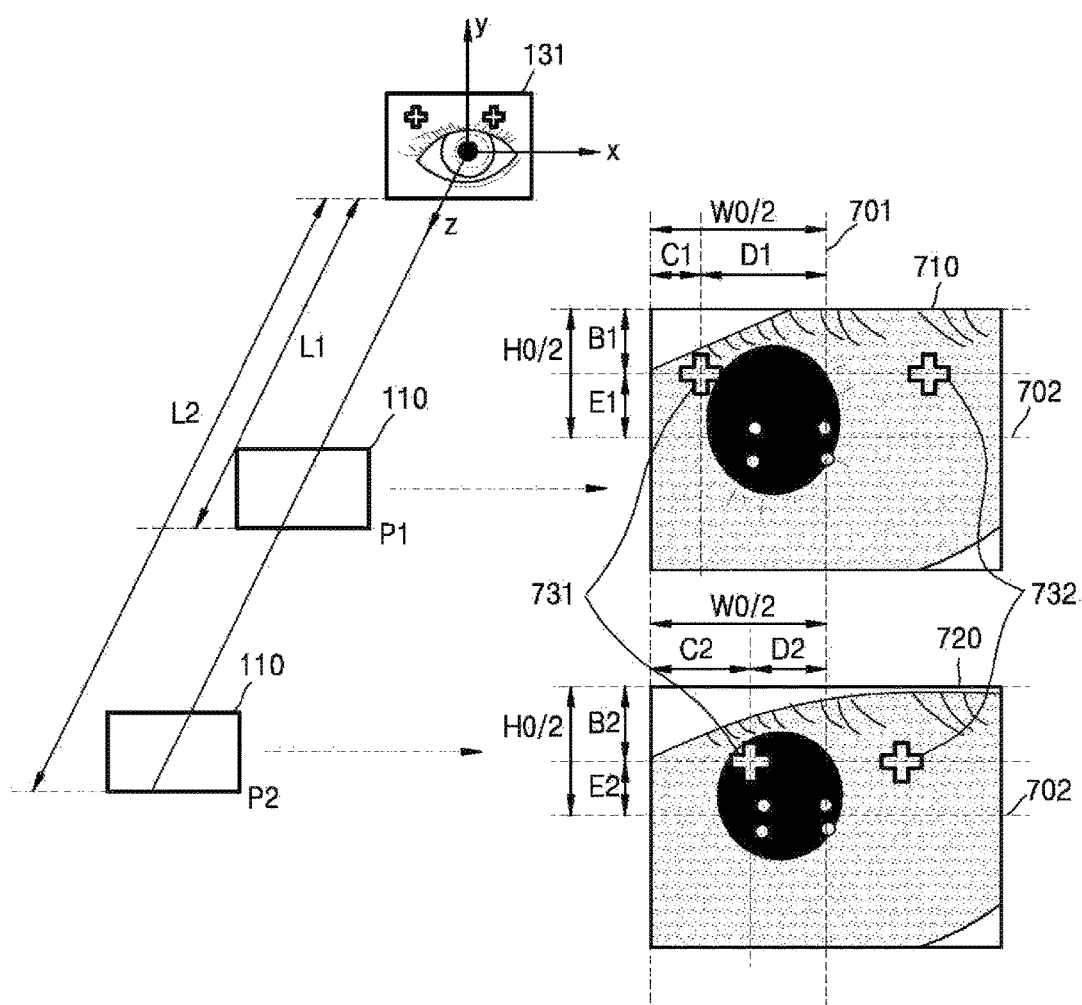
FIG. 10 is a diagram illustrating an example method of detecting and/or determining a misalignment tolerance that is generated when an example eye imaging camera moves.

FIG. 10 is a diagram illustrating an example method of detecting a tolerance that is generated when a photography unit 110 moves.

Referring to FIG. 10, when the photography unit 110 is moved along an optical axis (z axis), the photography unit 110 may actually move in x and y axial directions instead of accurately moving only in an optical axial (z axial) direction. Thus, a misalignment tolerance may be generated in the x and y axial directions.

Referring to FIG. 10, the photography unit 110 may acquire a first image 710 when positioned at a first point P1, and a second image 720 when positioned at a second point P2. When the photography unit 110 moves from the first point P1 to the second point P2, if the photography unit 110 accurately moves only along the optical axis (z axis) without moving along an x axis, a distance D1 measured from the first image 710 (distance between a vertical center line 701 of the first image 710 and a first reference mark 731) and a distance D2 measured from the second image 720 (distance between a vertical center line 701 of the second image 720 and a second reference mark 741) establish a relationship of D2=D1*L1/L2.

Referring to FIG. 10, since D1=W0/2−C1 and D2=W0/2−C2, a relationship of W0/2−C2=(W0/2−C1)*L1/L2 may be established. Accordingly, when the photography unit 110 moves from the first point P1 to the second point P2, if the photography unit 110 accurately moves only along the optical axis (z axis) without moving along the x axis, a distance C1 measured from the first image 710 and a distance C2 measured from the second image 720 need to establish a relationship of W0/2−C2=(W0/2−C1)*L1/L2. As described above with reference to FIGS. 8 and 9, L1/L2 may be determined using a distance A1 between the reference marks within the first image 710 and a distance A2 between the reference marks within the second image 720.

When the distance C1 measured from the first image 710 and the distance C2 measured from the second image 720 do not establish a relationship of W0/2−C2=(W0/2−C1)*L1/L2, the viewfinder apparatus 100 may determine that the misalignment tolerance has been generated in the x axial direction.

When it is determined that the tolerance has been generated in the x axial direction, the viewfinder apparatus 100 may determine the misalignment tolerance in the x axial direction.

For example, when the photography unit 110 moves from the first point P1 to the second point P2, if the photography unit 110 does not move along the x axis, a relationship of C2=W0/2−L1/L2*(W0/2−C1) is established. Thus, the tolerance in the x axial direction may be determined from a difference between a distance C2 actually measured from the second image 720 and W0/2−L1/L2*(W0/2−C1). If the actually measured distance C2 is greater than W0/2−L1/L2*(W0/2−C1), this means that the photography unit 110 has been moved in a positive direction of the x axis. If the actually measured distance C2 is less than W0/2−L1/L2*(W0/2−C1), this means that the photography unit has been moved in a negative direction of the x axis.

Referring to FIG. 10, when the photography unit 110 moves from the first point P1 to the second point P2, if the photography unit 110 accurately moves only along the optical axis (z axis) without moving along a y axis, a distance E1 measured from the first image 710 (distance between a horizontal center line 702 of the first image 710 and the first reference mark 731 and a distance E2 measured from the second image 720 (distance between a horizontal center line 702 of the second image 720 and the second reference mark 741) establish a relationship of E2=E1*L1/L2.

Referring to FIG. 10, since E1=H0/2−B1 and E2=H0/2−B2, a relationship of H0/2−B2=(H0/2−B1)*L1/L2 may be established. Accordingly, when the photography unit 110 moves from the first point P1 to the second point P2, if the photography unit 110 accurately moves only along the optical axis (z axis) without moving along the y axis, a distance B1 measured from the first image 710 and a distance B2 measured from the second image 720 need to establish a relationship of H0/2−B2=(H0/2−B1)*L1/L2. As described above with reference to FIGS. 8 and 9, L1/L2 may be calculated using the distance A1 between the reference marks within the first image 710 and the distance A2 between the reference marks within the second image 720.

When the distance B1 measured from the first image 710 and the distance B2 measured from the second image 720 do not establish a relationship of H0/2−B2=(H0/2−B1)*L1/L2, the viewfinder apparatus 100 may determine that the misalignment tolerance has been generated in the y axial direction.

When it is determined that the misalignment tolerance has been generated in the y axial direction, the viewfinder apparatus 100 may determine the misalignment tolerance in the y axial direction.

For example, when the photography unit 110 moves from the first point P1 to the second point P2, if the photography unit 110 does not move along the y axis, a relationship of B2=H0/2−L1/L2*(H0/2−B1) is established. Thus, the misalignment tolerance in the y axial direction may be determined from a difference between a distance B2 actually measured from the second image 720 and H0/2−L1/L2*(H0/2−B1). If the actually measured distance B2 is greater than H0/2−L1/L2*(H0/2−B1), this means that the photography unit 110 has been moved in a negative direction of the y axis. If the actually measured distance B2 is less than H0/2−L1/L2*(H0/2−B1), this means that the photography unit 110 has been moved in a positive direction of the y axis.

Figure 11:
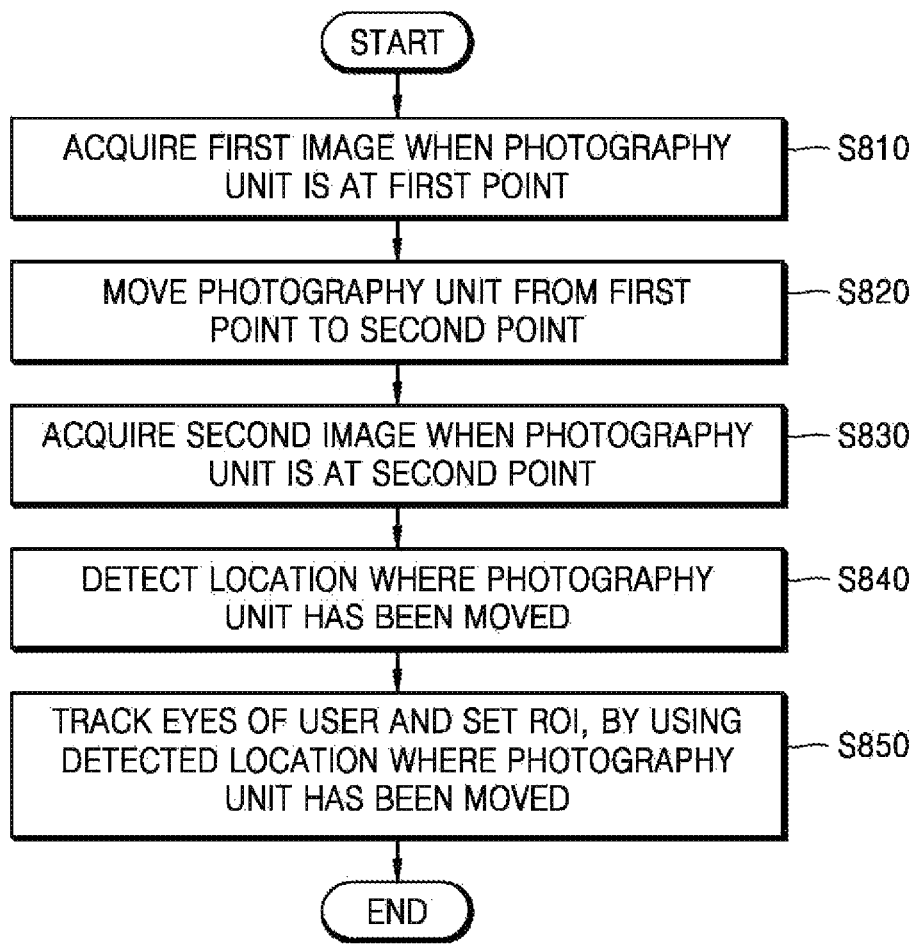
FIG. 11 is a flowchart illustrating an example method of operating a viewfinder apparatus.
Figure 12:
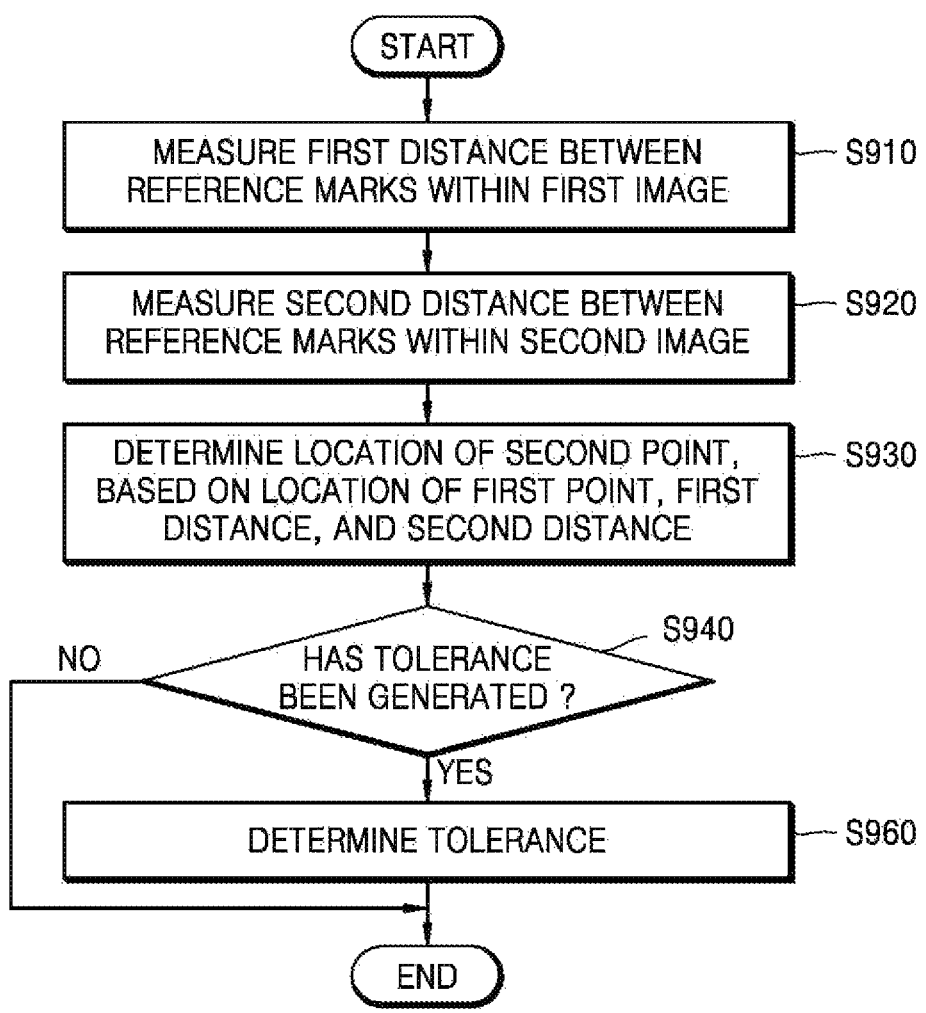
FIG. 12 is a flowchart illustrating an example operation included in the method of FIG. 11.

FIG. 11 is a flowchart illustrating an example method of operating a viewfinder apparatus 100. FIG. 12 is a flowchart illustrating operation S840 included in the example method of FIG. 11.

Referring to FIG. 11, the viewfinder apparatus 100 may acquire a first image by photographing, at a first point, the eyes of a user via a window on which a reference mark is displayed (S810).

In this case, the viewfinder apparatus 100 may include an IR LED, and the IR LED may be disposed near the window. The photography unit 110 may include an IR camera.

The IR LED may light up every time the photography unit 110 photographs a specific subject via the window. For example, when the IR LED lights up when the photography unit 110 photographs the eyes of a user via the window, the eyes of the user fail to recognize that the IR LED lights up, since the eyes of the user are unable to sense IR. However, the photography unit 110 may photograph the eyes of the user by using IR emitted from the IR LED.

The reference mark may be formed of an IR material. The IR material is a material that reflects IR, and thus may not be recognized by the eyes of a user but may be recognized by an IR camera. Thus, the first image captured by the photography unit 110 including an IR camera may include the reference mark.

The viewfinder apparatus 100 may move the photography unit 110 from the first point to a second point (S820).

The viewfinder apparatus 100 may move an optical system included in a viewfinder in an optical axis direction, in order to adjust a viewfinder image displayed on the display 140 based on the eyesight of a user.

The photography unit 110 may be included in the optical system, and may be moved in the same direction as the direction in which the optical system is moved. Thus, when the optical system is moved in the optical axis direction, the photography unit 110 located at the first point may be moved to the second point along the optical axis.

The viewfinder apparatus 100 may acquire a second image by photographing, at the second point, the eyes of the user via the window on which the reference mark is displayed (S830).

The viewfinder apparatus 100 may detect the location where the photography unit 110 has been moved, based on a location of a reference mark included in the first image and a location of a reference mark included in the second image (S840).

Operation S840 will now be described in greater detail below with reference to FIG. 12.

Referring to FIG. 12, the viewfinder apparatus 100 may measure a first distance between reference marks within the first image (S910).

The first image is an image that is captured by the photography unit 110 located at the first point in operation S810 of FIG. 11. For example, the reference mark displayed on the window may include a first reference mark and a second reference mark, and the first image may include a first reference mark and a second reference mark. The viewfinder apparatus 100 may measure a first distance between the first reference mark and the second reference mark within the first image.

The viewfinder apparatus 100 may measure a second distance between reference marks within the second image (S920).

The second image is an image that is captured by the photography unit 110 located at the second point in operation S830 of FIG. 11. The second image may include a first reference mark and a second reference mark, and the viewfinder apparatus 100 may measure a second distance between the first reference mark and the second reference mark within the second image.

The viewfinder apparatus 100 may determine a location of the second point (for example, a distance between the second point and the window), based on a location of the first point (for example, a distance between the first point and the window), the first distance measured within the first image, and the second distance measured within the second image (S930).

The viewfinder apparatus 100 may determine whether a misalignment tolerance has been generated as the photographing unit moves (S940).

For example, when the photography unit 110 is moved along an optical axis (z axis), the photography unit 110 may actually move in x and y axial directions instead of accurately moving only in an optical axial (z axial) direction. Thus, the tolerance may be generated in the x and y axial directions.

The viewfinder apparatus 100 may determine whether the tolerance has been generated in the x and y axial directions, based on the location of the reference marks included in the first image and the location of the reference marks included in the second image. For example, as described above with reference to FIG. 10, when a distance C1 measured from the first image and a distance C2 measured from the second image do not establish a relationship of $W0/2-C2=(W0/2-C1)*L1/L2$, the viewfinder apparatus 100 may determine that the tolerance has been generated in the x axial direction.

When a distance B1 measured from the first image and a distance B2 measured from the second image do not establish a relationship of $H0/2-B2=(H0/2-B1)*L1/L2$, the viewfinder apparatus 100 may determine that the tolerance has been generated in the y axial direction.

When it is determined that the tolerance has been generated in at least one of the x and y axial directions, the viewfinder apparatus 100 according to an exemplary embodiment may determine the tolerance (S960).

For example, as described above with reference to FIG. 10, the tolerance in the x axial direction may be determined from a difference between a distance C2 actually measured from the second image and $W0/2-L1/L2*(W0/2-C1)$. The tolerance in the y axial direction may be calculated from a difference between a distance B2 actually measured from the second image and $H0/2-L1/L2*(H0/2-B1)$.

Referring back to FIG. 11, the viewfinder apparatus 100 may track the eyes of the user and set as an ROI an area of the display that intersects the tracked eyes of the user, using a location of the photography unit 110 (e.g., a distance between the photography unit 110 or the window and generated tolerance) (S850).

The viewfinder apparatus 100 may track an eye direction of the user (for example, an optical axis of the eyes) by analyzing an eye image of the user that is captured based on the location of an illuminator (for example, an IR LED) for providing light when the eyes of the user are photographed, and the location of the photography unit 110 (distance between the window and the photography unit 110). When the photography unit 110 is moved, the location of the photography unit 110 (distance between the window and the photography unit 110) is changed. Thus, to increase the accuracy of tracking the eyes of a user, the viewfinder apparatus 100 needs to track the eyes of a user by using a parameter in which a location where the photography unit has been moved is reflected.

The viewfinder apparatus 100 may track the eyes of the user, based on a location where the photography unit 110 has been moved in the optical axial direction and tolerances in the x and y axial directions that are generated due to the movement of the photography unit 110. Moreover, the viewfinder apparatus 100 may detect the area of the display 140 that intersects the tracked eyes of the user, and set the detected area as an ROI which is viewed by the user.

Since the viewfinder apparatus 100 may detect a location where a camera that tracks the eyes of a user has been moved, the accuracy of eye tracking is improved.

Since the viewfinder apparatus 100 may detect the location where the camera that tracks the eyes of a user has been moved, by using an image captured by the camera, the viewfinder apparatus 100 does not need a special sensor for detecting the amount of movement of the camera.

A method of operating a viewfinder apparatus may be embodied as program commands executable by various computer means and may be recorded on a non-transitory computer-readable recording medium. The non-transitory computer-readable recording medium may include program commands, data files, data structures, and the like separately or in combinations. The program commands to be recorded on the non-transitory computer-readable recording medium may be specially designed and configured for example embodiments of the disclosure or may be well-known to and be usable by one of ordinary skill in the art of computer software. Examples of the non-transitory computer-readable recording medium include a magnetic medium such as a hard disk, a floppy disk, or a magnetic tape, an optical medium such as a compact disk-read-only memory (CD-ROM) or a digital versatile disk (DVD), a magneto-optical medium such as a floptical disk, and a hardware device specially configured to store and execute program commands such as a ROM, a random-access memory (RAM), or a flash memory. Examples of the program commands are advanced language codes that can be executed by a computer by using an interpreter or the like as well as machine language codes compiled by a compiler.

The examples should be considered in a descriptive sense only and not for purposes of limitation. Descriptions of features or aspects within each example should typically be considered as available for other similar features or aspects in other examples.

While the disclosure has been particularly shown and described with reference to examples thereof, it will be understood by those of ordinary skill in the art that various changes in form and details may be made therein without departing from the spirit and scope of the disclosure as defined by the following claims.

What is claimed is:

1. A viewfinder apparatus comprising:
   a window on which first and second reference marks are disposed;
   a movable eye imaging camera configured to photograph at least one eye of a user via the window; and
   a controller configured to detect a current position of the eye imaging camera, based on a first distance between the first reference mark and the second reference mark in a first image captured by the eye imaging camera when the eye imaging camera is at a first position different from the current position and a second distance between the first reference mark and the second reference mark in a second image captured by the eye imaging camera when the eye imaging camera is at the current position; and track the eye of the user based on the detected current position of the eye imaging camera.

2. The viewfinder apparatus of claim 1, further comprising a display configured to display at least one object,
   wherein the viewfinder apparatus is configured to set, as a region of interest (ROI), an area of the display that intersects with the tracked eye of the user.

3. The viewfinder apparatus of claim 2, wherein the display is configured to display a viewfinder image from which a composition and photographing conditions of a subject that is to be photographed using the viewfinder apparatus are presented.

4. The viewfinder apparatus of claim 2, further comprising an optical system movable along an optical axis and configured to provide the user with an image that is displayed on the display via reflection or refraction of light incident via the window,
   wherein the eye imaging camera is movable in a same direction as a direction in which the optical system is movable.

5. The viewfinder apparatus of claim 1, further comprising a storage configured to store a distance between the eye imaging camera and the window at the first position of the eye imaging camera as a reference distance.

6. The viewfinder apparatus of claim 1, wherein, as distance between the window and the eye imaging camera increases, distance between the first reference mark and the second reference mark in images captured by the eye imaging camera decreases, and, as distance between the window and the eye imaging camera decreases, distance between the first reference mark and the second reference mark in images captured by the eye imaging camera increases.

7. The viewfinder apparatus of claim 1, wherein distance between the window and the eye imaging camera is inversely proportional to distance between the first reference mark and the second reference mark in images captured by the eye imaging camera.

8. The viewfinder apparatus of claim 1, wherein the controller is configured to determine a misalignment tolerance generated due to movement of the eye imaging camera, based on at least the first distance between the first reference mark and the second reference mark in the first image and the second distance between the first reference mark and the second reference mark in the second image, and track the eye of the user based on the determined misalignment tolerance.

9. The viewfinder apparatus of claim 1, wherein
   the eye imaging camera comprises an infrared (IR) camera, and
   the reference mark comprises a material that reflects IR.

10. A method of operating a viewfinder apparatus, comprising:
    acquiring a first image by photographing at least one eye of a user via a window on which first and second reference marks are disposed, using an eye imaging camera positioned at a first position;
    moving the eye imaging camera;
    acquiring a second image by photographing the eye of the user via the window, using the eye imaging camera after the moving;
    detecting, as a second position of the eye imaging camera, a position of the eye imaging camera after the moving, based on a first distance between the first reference mark and the second reference mark in the first image and a second distance between the first reference mark and the second reference mark in the second image; and
    tracking the eye of the user using based on the detected second position of the eye imaging camera.

11. The method of claim 10, further comprising:
    displaying at least one object on a display; and
    setting, as a region of interest (ROI), an area of the display that intersects with the tracked eye of the user.

12. The method of claim 11, wherein displaying the at least one object on the display comprises displaying a viewfinder image from which a composition and photographing conditions of a subject that is to be photographed using the viewfinder apparatus are presented.

13. The method of claim 11, wherein moving the eye imaging camera comprises moving the eye imaging camera in a same direction as a moving direction of an optical system movable along an optical axis and configured to provide the user with an image displayed on the display via reflection or refraction of light incident via the window.

14. The method of claim 10, further comprising storing a distance between the eye imaging camera and the window at the first position of the eye imaging camera as a reference distance.

15. The method of claim 10, wherein, as distance between the window and the eye imaging camera increases, distance between the first reference mark and the second reference mark in images captured by the eye imaging camera decreases, and, as distance between the window and the eye imaging camera decreases, distance between the first reference mark and the second reference mark in images captured by the eye imaging camera increases.

16. The method of claim 10, wherein distance between the window and the eye imaging camera is inversely proportional to distance between the first reference mark and the second reference mark in images captured by the eye imaging camera.

17. The method of claim 10, further comprising:
- determining a misalignment tolerance generated due to movement of the eye imaging camera, based on at least the first distance between the first reference mark and the second reference mark in the first image and the second distance between the first reference mark and the second reference mark in the second image, and
- tracking the eye of the user based on the determined misalignment tolerance.

18. A non-transitory computer-readable recording medium having recorded thereon a computer program, which, when executed by a computer, controls a viewfinder apparatus to perform at least:
- acquiring a first image by photographing at least one eye of a user via a window on which first and second reference marks are disposed, using an eye imaging camera positioned at a first position;
- moving the eye imaging camera;
- acquiring a second image by photographing the eye of the user via the window, using the eye imaging camera after the moving;
- detecting, as a second position of the eye imaging camera, a position of the eye imaging camera after the moving, based on a first distance between the first reference mark and the second reference mark in the first image and a second distance between the first reference mark and the second reference mark in the second image; and
- tracking the eye of the user based on the detected second position of the eye imaging camera.

\* \* \* \* \*